May 14, 1968     R. R. HUSSEY     3,382,734

BICYCLE PEDAL

Filed Sept. 16, 1966

INVENTOR.

ROBERT R. HUSSEY

BY *Fay, Sharpe & Mulholland*

ATTORNEYS 3,382,734
BICYCLE PEDAL
Robert R. Hussey, Ashtabula, Ohio, assignor to The Ashtabula Bow Socket Company, Ashtabula, Ohio, a corporation of Ohio
Filed Sept. 16, 1966, Ser. No. 580,037
6 Claims. (Cl. 74—594.4)

ABSTRACT OF THE DISCLOSURE

A pedal is disclosed having an elongated core with a threaded portion on one end thereof. An elongated housing means is telescoped over the core with the threaded portion of the core extending from an end thereof. Bearings at either end of the housing means hold the core and the housing means in spaced co-axial relation. A unitary generally U-shaped frame is provided which includes an end portion surrounding the end of the core opposite the threaded end and the adjacent housing end and side members spaced from and extending along the length of the housing means. A brace extends from one side portion of the frame to the other with its intermediate portion surrounding the core between the threaded portion and the adjacent bearing means. A pair of elastomeric members each having a free length greater than the distance between the end portion of the frame and the brace are secured adjacent an inside surface of each of the side portions of the frame by means of a longitudinal compressive force exerted by the end portion of the frame means and the brace.

---

This invention relates generally to bicycle pedals and, in particular, to a pedal having a bow-like frame member.

Prior art pedals of the bow-type construction are known but have generally proved unsatisfactory for various reasons. Specifically, these prior art pedals have lacked: sufficient over-all structural rigidity, ability to retain treads securely, and ability to absorb transverse and lateral shocks. Moreover, because of complex assembly procedures required they have prompted excessive manufacturing costs.

By way of example, a prior art pedal is known in which a concave molded rubber tread is held in position by a metal frame bowed to wrap around the outer periphery of the tread. The problems incumbent in this type of construction include matters of assembly in which the outer frame of the pedal must first be spread about the tread and thereafter pinched and clamped to an end member for the pedal to maintain the proper assembled relation.

The pedal according to the invention overcomes the problems of bow-like pedals of the prior art in that, by use of an elastomeric member of a length slightly in excess of the central length of the pedal, the tread is compressed during assembly to provide a coaction and structural cooperation between the central portion of the pedal and the bow frame member, as well as along the axial length of the pedal between the end portion of the bow-shaped frame member and the opposite end brace to provide a degree of rigidity and strength not heretofore possible. Moreover, simplicity and relative ease of construction of this novel pedal facilitate relatively inexpensive manufacture.

The pedal according to the invention comprises an elongated core or central spindle having a threaded portion adjacent one end thereof for insertion into the threaded opening in a crank arm assembly of a cycle, for example, bicycle, or tricycle. A central elongated housing means, or central tubular member, is telescoped over the central core allowing the threaded portion to protrude therefrom. End means, for example, an end plate or brace, and the end portion of a generally U-shaped frame member and a bearing means are provided for maintaining the housing means and the core in a spaced coaxial relation to permit freedom of rotation under the foot of the cyclist.

Frame means having a looped or bowed construction including an end portion and side member means is provided. The end portion is located at the end of the core opposite the threaded portion and merges into said side member means which extend in spaced relation to the length of the housing means from said end portion to an end brace, to maintain the relative bow shape of the frame means.

During assembly, elongated elastomeric members are inserted between the end portion of the frame and the end brace in such a manner that when pressure is exerted on the end portion of the frame the elastomeric members compress and deform to assume the configuration of the inner contour of the elongated side member portion of the frame means. The elastomeric members lie between the end portion and end brace in a state of compression which applies force along the axial length of the pedal as well as relatively transverse to the core of the pedal by virtue of the reaction forces of the elastomeric member between the housing means and the frame side member.

By this manner of unique cooperation between the elastomeric member or tread and the frame and the other structural elements of the pedal, an improved structural rigidity is achieved. It can be seen that the compressive nature of the elastomeric members provides a tensioning effect to the frame means to impart a high degree of rigidity thereto.

Accordingly, it is an object of this invention to provide an improved and new bicycle pedal.

It is another object of this invention to provide a pedal having an elastomeric member in a state of compression to tension the frame of the pedal to provide an increased degree of rigidity.

It is a still further object of this invention to provide a new and improved bicycle pedal utilizing an elastomeric member of greater length than the axial length of the internal portion of the pedal so that during assembly the elastomeric members assume the contour of the side portion of the frame while maintaining communication with the central housing means to provide forces axially and transversely to the central portion of the pedal to tension the pedal frame to achieve an increased degree of rigidity.

In the drawings:

FIG. 2 shows one of a pair of elastomeric members in its free state prior to assembly having a length in excess of the length from the end portion of the frame means to the end brace of the pedal;

Figure 1:
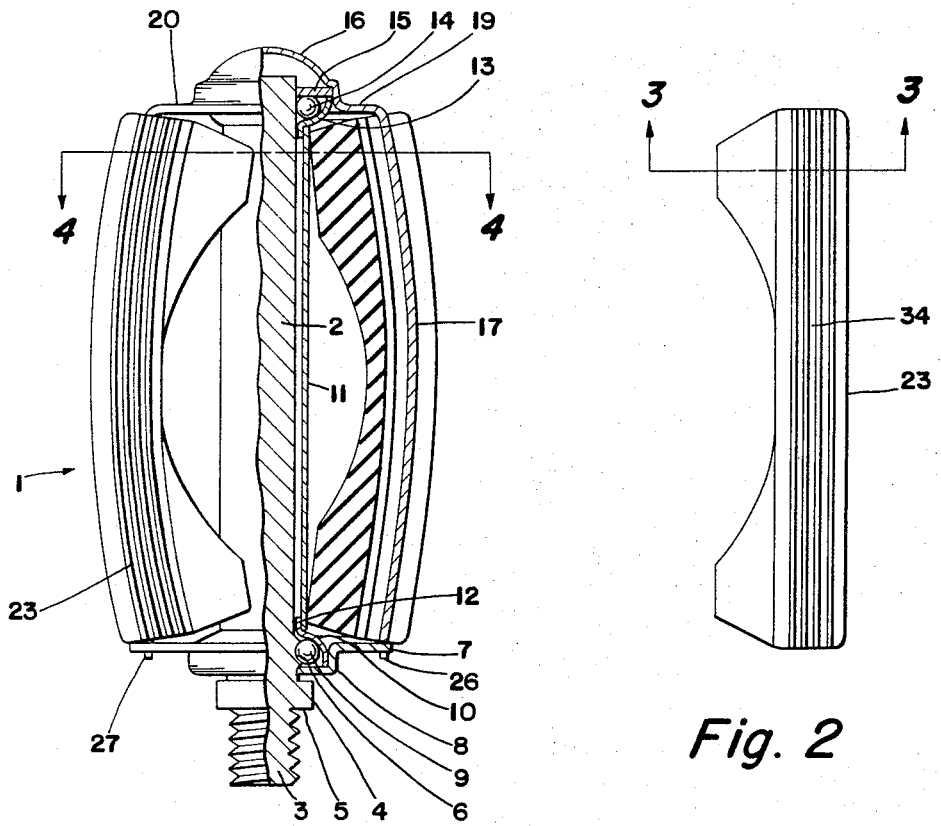
FIG. 1 shows a plan view, partially in horizontal section, of the assembled pedal wherein the right-hand portion thereof generally illustrates the component parts.

In the illustrated embodiment, a pedal, generally designated by the numeral 1, includes an elongated core or axle 2, having a threaded portion 3 at one end thereof. The core 2 acts as the shaft or spindle upon which the pedal 1 is rotatably mounted. Threaded portion 3 cooperates with crank arm, not shown, in a manner which is well known in the art to rotatably drive a sprocket assembly for propulsion of a cycle. The axle or core 2 may include a hub portion 4 of suitable cross section for gripping the pedal with a suitable wrench during insertion and tightening of the pedal 1 to the crank arm. The shoulder 5 on the axle 2 may be abutted to the crank arm of the cycle to indicate that the pedal 1 is fixedly secured to the crank arm.

A journal, or race, for the bearings 9, as shown at 6, may be conveniently rolled into the axle 2 during the threading operation and also prevents the inadvertent withdrawal of axle 2 from the pedal. Bearing 9 is illustrated of only one of a plurality of like bearings arranged in a suitable circumferential relationship to axle 2, and hence will be referred to in the plural.

An end brace, or end plate 7, including a cup-shaped central portion 8 is provided on the end of the pedal 1 adjacent to the threaded portion 3 and provides the innermost end portion of the pedal. The cup-shaped central portion 8 of end plate 7 is structurally related to journal 6 and bearings 9 to provide a rigid yet freely rotative path for the bearings 9 at the innermost end of pedal 1. The bearings 9 may be lubricated with a suitable lubricant during assembly.

An inner ball cup 10 is provided for retention of the bearings in proper relationship with the axle 2 and journal 6. While inner ball cup 10 is shown as generally cup-shaped having a wall nearly in an axial direction, other configurations are also satisfactory, as long as the end plate 7, journal 6, bearings 9, and inner ball cup 10 cooperate to maintain a unitarily-coacting rotative relationship.

A central portion, tubular member, spacing sleeve or housing means 11 is provided which telescopes over the axle, or core 2 in such a manner that the threaded portion extends therefrom.

The housing means 11 may abut inner ball cup 10 or be in a grooved relationship therewith or the housing means may slip over an axially extending annular protrusion 12 of inner ball cup 10. The latter is preferred for purposes of rigidity and proper coaxial alignment between the parts. As an alternative, housing means 11 and inner ball cup 10 may be of unitary construction.

Bearing means are provided including an outer ball cup 13, bearings 14 and washer 15 for maintaining a central housing means 11 and the axle or core 12 in a properly spaced coaxial relationship at the end of the axle opposite the threaded end and for ease of rotative movement under the foot of the cyclist.

Frame means comprises a generally U-shaped frame member, or bow member, including an end portion and side members 17 and 18. The frame means comprises the major portion of the outer structural periphery of the pedal and is preferably of an integral construction.

An end portion 16 of frame means 15 encloses the end of the core 2 and the housing means 11 together with the bearing means therein. The end portion 16 further includes portions 19 and 20 extending transversely of core 2 in generally opposite directions as shown.

Elastomeric members 23 having a free length before assembly greater than the length of the housing means 11 from end portions 19 and 20 to the end brace 7 are inserted in the pedal in such a manner that when pressure is provided to the end portion 16 of the bow member during assembly and before the clinching operation, the elastomeric members 23 assume the contour shown in FIG. 1. The elastomeric members 23 when placed in compression during the assembly operation exert a force at points spaced along the housing means and against the end portions 19 and 20 and the end brace 7, thereby to communicate with the side members 17 and 18, or the portion of the frame means extending in spaced relation to the length of the housing means, in a bow-type configuration.

Figure 4:
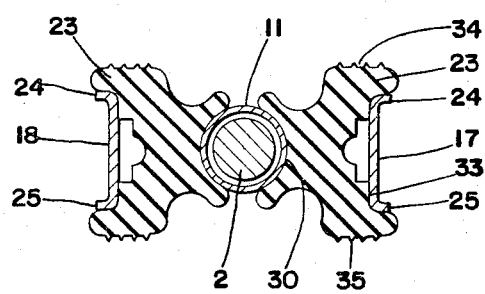
FIG. 4 shows a cross section of the pedal taken along line 4—4 of FIG. 1, showing transverse section of the pedal near the end opposite the brace and threaded portion of the core.

It can be understood that any particular cross section of the side means may be suitable, and may include, for example, a reinforcing web (not shown) or turned edges, as shown at 24 and 25 in FIG. 4 for increased strength of the frame means. Moreover, the side members 17 and 18 may be slotted to receive reflector means where desired.

It can be understood that the elastomeric members 23, when placed in compression during the assembly of the pedal in the manner previously discussed, exert force against the end portions 19 and 20 of the frame means and the stud end brace 7 which tends to tension the frame means. Since the frame means is in tension due to the compression of the elastomeric members 23 in a manner discussed, increased pedal rigidity is possible. Simultaneously, each of the elastomeric members 23 is in communication with a portion 17 or 18 of the frame means and the housing means 11 at least two portions thereon.

Since the elastomeric members 23 are in compression as previously discussed, forces are exerted on the housing means 11 and the side members 17 and 18 of the frame means in a direction generally transverse to the axle 2. In this manner, the frame means is kept in tension upon assembly.

When the elastomeric members 23 are compressed and assume a contour relatively congruent to side members 17 and 18 and while pressure is exerted on end portion 16 during assembly, stubs, or tab-like ends 26 and 27, at the ends of side members 17 and 18, respectively extend through elongated slot portions or apertures in end plate 7. The ends 26 and 27 are thus crimped or clinched to fasten the frame means to the end plate to provide a rigid structure.

In the preferred embodiment illustrated, the elastomeric members are each in communication with the housing means at at least two locations. Preferably the pair of elastomeric members exert the force on the housing means from positions relatively opposite to each other. The transmission of forces due to the compression of the elastomeric members in directions relatively transverse to the axle also tend to tension the frame means with respect to the end brace in a manner which provides increased pedal rigidity.

Accordingly, the elastomeric members, having a free length as shown in FIG. 2, are compressed into the bow-like configuration as shown in FIG. 1 with a new and improved result of increased pedal rigidity. Moreover, it is possible to utilize molded or extruded members having the configuration of FIG. 2 for deflection into the curved configuration as shown in FIG. 1. When extruded members are used, the extrusion is cut to achieve the shape of FIG. 2.

Moreover, in utilizing extruded or molded elastomeric members in the pedal according to the invention, the compression, or pre-stressing of the members results in longer tread life since the compressed elastomeric member is more wear-resistant.

Furthermore, the pedal according to the invention permits the effective use of extruded elastomeric members since the desired contour is assumed during assembly. Thus, cost savings are effected since linearly extruded products may be used.

Figure 3:
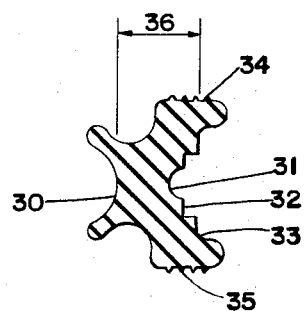
FIG. 3 shows a cross section of the elastomeric member taken along line 3—3 of FIG. 2.

FIG. 3 is a section along line 3—3 of FIG. 2 showing a cross section of elastomeric members 23. The inner surface 30 is relatively geometrically complementary with the periphery of the housing means 11 to provide an area of surface contact of the elastomeric member on the housing means in the assembled pedal.

Surface 31 of elastomeric member 23 on the side opposite surface 30 is in communication with the reinforcing rib on the frame means, when used and further may serve to guide the elastomeric member during assembly and to assist in centering the elastomeric member relative to the frame means. Surface 32 defines a slot in the elastomeric member indicative of the removal of some of the substance of the member to decrease the weight and to facilitate ease of assembly. Surface 33 defines a slot which communicates and coacts with side members 17 and 18 of the frame means, as can best be seen in FIG. 4.

The top and bottom surfaces 34 and 35 of the elastomeric members 23 may be serrated for increased contact with a foot of the cyclist and to prevent slippage between a foot and the pedal. Various serrated designs are possible.

Dimension 36 is generally transverse to the length of elastomeric members 23 and lies between surface 30 and surface 33. Dimension 36 must be of such a nature that ease of assembly is effected. It can best be seen in FIG. 1 that, at the time of clinching during assembly of the pedal, dimension 36 is in relatively rigid placement between housing means 11 and frame means 17 or 18 near tabs 26 and 27, respectively.

The assembly of the pedal according to the invention is accomplished relatively inexpensively and with a minimum of manual manipulation. After the core 2 has been positioned into a fixture, and end brace 7, bearings 9 and ball cup 10 have been positioned, housing means 11, outer ball cup 13 and bearings 14 are inserted. Elastomeric members 23, in their free length as shown in FIG. 2, are positioned, and washer 15 is then added. Thereafter, the frame means are positioned, over the assembly. It may easily be understood that the frame means are placed in register with the previous completed sub-assembly over the outer end of core 2 and housing means 11 with relative facility since the treads are in a relatively linear free length, and thus do not interfere with the positioning of the frame means.

Moreover, the frame means need not be opened and thereafter closed to complete the assembly, as is the case in certain prior art pedals. Pressure is exerted on the frame means and the tab portions 26 and 27 are positioned in the end brace 7 with the elastomeric members confined between end portions 19 and 20 and end plate 7. As the tab portions approach and traverse the elongated opening in the end brace, the elastomeric members are simultaneously being placed in compression and assume the contour illustrated in FIG. 1, until the desired bowed configuration is attained. The tabs are then clinched over the elongated apertures in brace 7 to maintain tension in the frame means and compression and accompanying deflection of the elastomeric members.

For ease of description, the principles of the invention have been set forth with but a few illustrated embodiments showing the invention. It is not my intention, however, that the illustrated embodiments nor the terminology employed in describing them be limiting inasmuch as variations of these may be made without departing from the spirit of the invention. Rather, I desire to be restricted only by the scope of the appended claims.

I claim:
1. A pedal comprising:
    an elongated core,
    a threaded portion adjacent one end of said core,
    elongated housing means telescoped over said core with said threaded portion extending therefrom,
    bearing means maintaining said housing means and said core in spaced co-axial relation,
    frame means including an end portion, said end portion surrounding the end of said core and said housing means opposite said threaded portion and extending transversely of said core in opposite directions,
    a brace having a portion intermediate the threaded portion and the bearing means adjacent thereto,
    said frame means further including side portions extending in spaced relation to the length of said housing means from said end portion to said brace,
    a pair of elongated elastomeric members each having a free length greater than the distance between said end portion of said frame means and said brace,
    each of said elastomeric members being secured adjacent an inside surface of a side portion of said frame means by means of a longitudinal compressive force exerted over its length by engagement of one of the ends of said elastomeric member with said end portion of said frame means, and the other of the ends of said elastomeric member with said brace, such that the resistance of the elastomeric members to said longitudinal compressive force creates a tensioning of said side portions of said frame means thereby adding rigidity to the pedal structure.

2. The pedal of claim 1 wherein the frame means comprises a pair of bow-like side portions, each having the opposite ends thereof more closely adjacent to said housing means than the intermediate portions thereof.

3. The pedal of claim 1 in which the frame means is a unitary frame member.

4. The pedal of claim 1 in which each of said elastomeric members is secured against an inside surface of a side portion of said frame means.

5. The pedal of claim 4 wherein each of said elastomeric members is in communication with said housing means at least at two locations thereon, the locations of communication of both of said pair of elastomeric members being approximately opposite to each other.

6. The pedal as defined in claim 5 wherein each of said elastomeric members further are in compression between said housing means and side portions of said frame means.

References Cited

UNITED STATES PATENTS

| | | | |
|---|---|---|---|
| 1,425,215 | 8/1922 | Persons | 74—594.4 |
| 3,127,789 | 4/1964 | Van De Loo | 74—594.4 |

FOREIGN PATENTS

| | | |
|---|---|---|
| 984,196 | 2/1951 | France. |

FRED C. MATTERN, Jr., *Primary Examiner.*

J. CORNETTE, *Assistant Examiner.*